(12) United States Patent
Yamamoto et al.

(10) Patent No.: US 9,627,715 B2
(45) Date of Patent: Apr. 18, 2017

(54) NON-AQUEOUS ELECTROLYTE SECONDARY BATTERY AND BATTERY PACK

(71) Applicant: Kabushiki Kaisha Toshiba, Minato-ku (JP)

(72) Inventors: Dai Yamamoto, Kashiwazaki (JP); Hidesato Saruwatari, Kashiwazaki (JP); Masanori Tanaka, Kashiwazaki (JP); Kazuya Kuriyama, Saku (JP); Hideki Satake, Kashiwazaki (JP); Hirotaka Hayashida, Kashiwazaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 378 days.

(21) Appl. No.: 14/483,354

(22) Filed: Sep. 11, 2014

(65) Prior Publication Data

US 2016/0261004 A1    Sep. 8, 2016

(30) Foreign Application Priority Data

Sep. 13, 2013 (JP) .................................. 2013-191084
Sep. 5, 2014 (JP) .................................. 2014-180966

(51) Int. Cl.
*H01M 10/0569* (2010.01)
*H01M 2/16* (2006.01)
(Continued)

(52) U.S. Cl.
CPC ....... *H01M 10/0569* (2013.01); *H01M 2/024* (2013.01); *H01M 2/026* (2013.01);
(Continued)

(58) Field of Classification Search
CPC ......... H01M 10/0569; H01M 10/0525; H01M 10/0568; H01M 10/0587; H01M 2/1653;
(Continued)

(56) References Cited

U.S. PATENT DOCUMENTS

2008/0176142 A1    7/2008   Inagaki et al.
2009/0081534 A1*   3/2009   Takami ............... H01M 2/1626
                                                           429/149
(Continued)

FOREIGN PATENT DOCUMENTS

CN    1744368 A     3/2006
CN    102035028 A   4/2011
(Continued)

OTHER PUBLICATIONS

Extended European Search Report issued Jun. 1, 2015 in Patent Application No. 14184224.5.
(Continued)

*Primary Examiner* — Jane Rhee
(74) *Attorney, Agent, or Firm* — Oblon, McClelland, Maier & Neustadt, L.L.P.

(57) ABSTRACT

A non-aqueous electrolyte secondary battery of an embodiment includes an exterior member, a negative electrode containing a titanium-containing oxide housed in the exterior member, a positive electrode housed in the exterior member, a separator housed in the exterior member and arranged between the positive electrode and the negative electrode, and a non-aqueous electrolyte solution housed in the exterior member. At least one type or more chain carbonates are contained in a solvent of the non-aqueous electrolyte solution. A self-diffusion coefficient of the chain carbonate in $-20°$ C. is front $1.4 \times 10^{-10}$ to $2.0 \times 10^{-10}$ m$^2$/sec.

20 Claims, 4 Drawing Sheets

(51) Int. Cl.
<table>
<tr><td>H01M 2/18</td><td>(2006.01)</td></tr>
<tr><td>H01M 4/131</td><td>(2010.01)</td></tr>
<tr><td>H01M 4/485</td><td>(2010.01)</td></tr>
<tr><td>H01M 10/0525</td><td>(2010.01)</td></tr>
<tr><td>H01M 10/0568</td><td>(2010.01)</td></tr>
<tr><td>H01M 2/02</td><td>(2006.01)</td></tr>
<tr><td>H01M 4/62</td><td>(2006.01)</td></tr>
<tr><td>H01M 4/66</td><td>(2006.01)</td></tr>
<tr><td>H01M 10/0587</td><td>(2010.01)</td></tr>
<tr><td>H01M 4/04</td><td>(2006.01)</td></tr>
<tr><td>H01M 4/1391</td><td>(2010.01)</td></tr>
<tr><td>H01M 4/02</td><td>(2006.01)</td></tr>
</table>

(52) U.S. Cl.
CPC ....... *H01M 2/0207* (2013.01); *H01M 2/0262* (2013.01); *H01M 2/0287* (2013.01); *H01M 2/1626* (2013.01); *H01M 2/1653* (2013.01); *H01M 2/18* (2013.01); *H01M 4/131* (2013.01); *H01M 4/485* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0587* (2013.01); *H01M 4/043* (2013.01); *H01M 4/0404* (2013.01); *H01M 4/1391* (2013.01); *H01M 2004/027* (2013.01); *H01M 2004/028* (2013.01); *H01M 2300/0037* (2013.01)

(58) Field of Classification Search
CPC ...... H01M 2/18; H01M 2/0207; H01M 2/024; H01M 2/026; H01M 2/0262; H01M 2/0287; H01M 2/1626; H01M 4/131; H01M 4/485; H01M 4/623; H01M 4/625; H01M 4/661
See application file for complete search history.

(56) References Cited

U.S. PATENT DOCUMENTS

| | | | |
|---|---|---|---|
| 2010/0099031 A1 | 4/2010 | Kato et al. | |
| 2011/0076557 A1 | 3/2011 | Ishii et al. | |
| 2012/0112139 A1* | 5/2012 | Chang | H01M 4/364 252/519.15 |
| 2012/0141878 A1* | 6/2012 | Ohashi | H01M 10/0567 429/300 |
| 2012/0264010 A1 | 10/2012 | Kato et al. | |
| 2014/0335405 A1 | 11/2014 | Kato et al. | |
| 2015/0017515 A1 | 1/2015 | Jeon et al. | |

FOREIGN PATENT DOCUMENTS

| | | |
|---|---|---|
| EP | 1 598 895 A1 | 11/2005 |
| EP | 2 306 558 A2 | 4/2011 |
| EP | 2 840 640 A1 | 2/2015 |
| JP | 2013-55006 | 3/2013 |
| WO | WO 2008/015987 A1 | 2/2008 |

OTHER PUBLICATIONS

Kikuko Hayamizu "Motions and Diffusions of ions in Polymer Electrolytes Observed by NMR Spectroscopy", The society of Rubber Science and Technology, Japan 5 pages ( with English Abstract).

Kikuko Hayamizu et al. "Pulse-Gradient Spin-Echo $^1$H, $^7$Li, and $^{19}$F NMR Diffusion and ionic Conductivity Measurements of 14 Organic Electrolytes Containing $LiN(SO_2CF_3)_2$", J. Phys. Chem. B 103, 1999, 6 pages.

Combined Chinese Office Action and Search Report issued Apr. 1, 2016 in Patent Application No. 201410465032.9 (with English language translation).

Office Action mailed Nov. 24, 2016 in Chinese Application No. 201410465032.9 (w/English translation).

\* cited by examiner

NON-AQUEOUS ELECTROLYTE SECONDARY BATTERY AND BATTERY PACK

CROSS-REFERENCE TO RELATED APPLICATION

This application is based upon and claims the benefit of priority from Japanese Patent Applications No. 2013-191084, filed on Sep. 13, 2013 and No. 2014-180966, filed on Sep. 5, 2014; the entire contents of which are incorporated herein by reference.

FIELD

Embodiments described herein relate to a non-aqueous electrolyte secondary battery and a battery pack.

BACKGROUND

Lithium ion secondary batteries are widely used in mobile devices, automobiles, storage batteries, and the like. The lithium ion secondary batteries have a problem that, in its nature, the battery performance is easily decreased under a low-temperature environment at several tens of degrees below the freezing point or less.

Therefore, higher battery performance is required even under a low-temperature environment.

DETAILED DESCRIPTION

A non-aqueous electrolyte secondary battery of an embodiment includes an exterior member, a negative electrode containing a titanium-containing oxide housed in the exterior member, a positive electrode housed in the exterior member, a separator housed in the exterior member and arranged between the positive electrode and the negative electrode, and a non-aqueous electrolyte solution housed in the exterior member. At least one type or more chain carbonates are contained in a solvent of the non-aqueous electrolyte solution. A self-diffusion coefficient of the chain carbonate in −20° C. is from $1.4 \times 10^{-10}$ to $2.0 \times 10^{-10}$ m$^2$/sec.

A battery pack of an embodiment includes a nonaqueous electrolyte secondary battery as a cell. The includes an exterior member, a negative electrode containing a titanium-containing oxide housed in the exterior member, a positive electrode housed in the exterior member, a separator housed in the exterior member and arranged between the positive electrode and the negative electrode, and a non-aqueous electrolyte solution housed in the exterior member. At least one type or more chain carbonates are contained in a solvent of the non-aqueous electrolyte solution. A self-diffusion coefficient of the chain carbonate in −20° C. is from $1.4 \times 10^{-10}$ to $2.0 \times 10^{-10}$ m$^2$/sec.

Hereinafter, embodiments will be exemplarily described with reference to the drawings. Note that detailed description common to embodiments is appropriately omitted. An upper portion and a lower portion in the specification are relatively expressed based on the drawings.

First Embodiment

According to the first embodiment, a non-aqueous electrolyte secondary battery is provided, which includes an exterior member, a negative electrode housed in the exterior member, a positive electrode housed in the exterior member, a separator housed in the exterior member and arranged between the positive electrode and the negative electrode, and a non-aqueous electrolyte solution housed in the exterior member.

Figure 1:
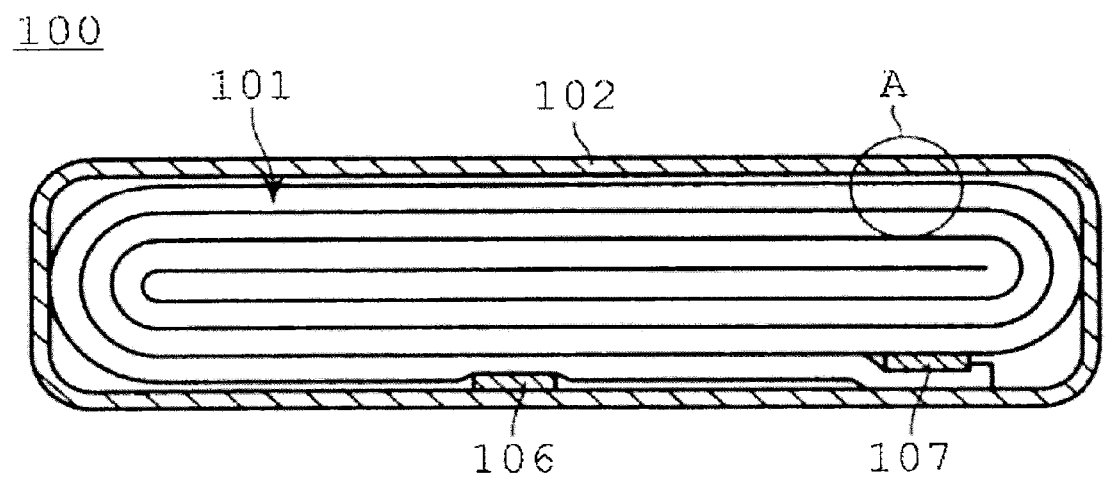
FIG. 1 is a conceptual diagram of a non-aqueous electrolyte secondary battery of an embodiment.
Figure 2:
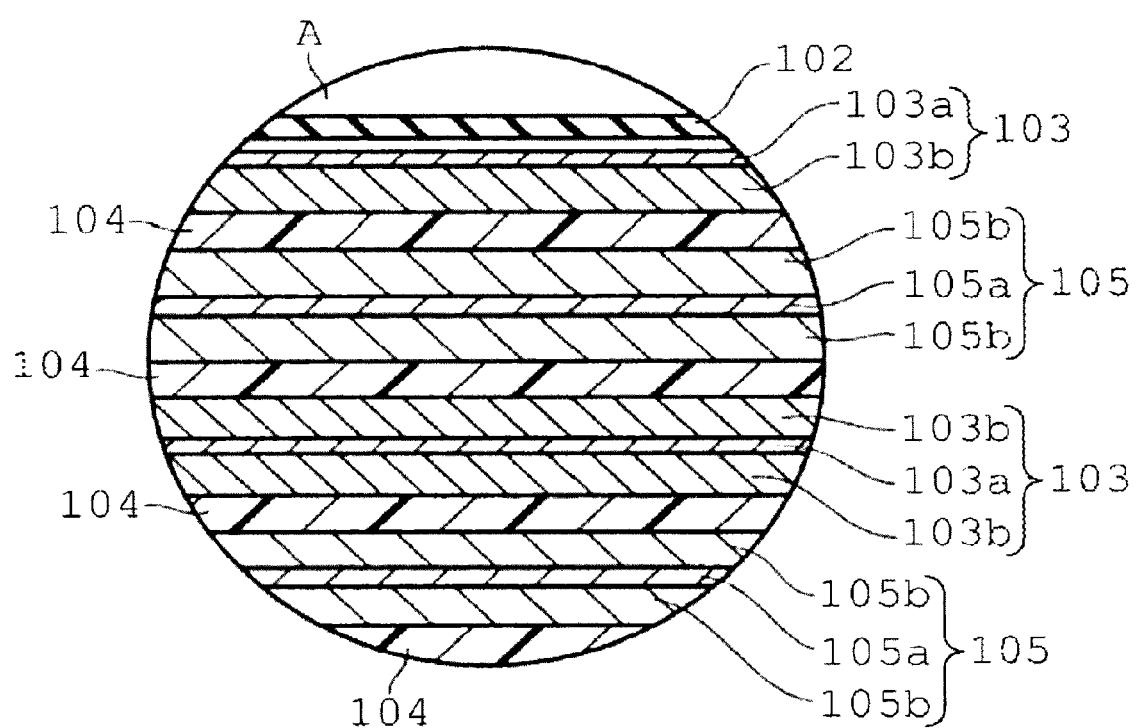
FIG. 2 is an enlarged conceptual diagram of a non-aqueous electrolyte secondary battery of an embodiment.

Description will be given in more detail with reference to the conceptual diagrams of FIGS. 1 and 2 exemplarily illustrating a non-aqueous electrolyte secondary battery 100 according to an embodiment. FIG. 1 is a cross-sectional conceptual diagram of the flat non-aqueous electrolyte secondary battery 100 in which a bag-like exterior material 102 is made of a laminated film, and FIG. 2 is an enlarged cross-sectional diagram of the A portion of FIG. 1. Note that the drawings are conceptual diagrams for description, and its shapes, dimensions, and ratios may be different from an actual device. However, design change can be appropriately made in consideration of the following description and known technologies.

A flat wound electrode group 101 is housed in the bag-like exterior material 102 formed of a laminated film, which is made such that an aluminum foil intervenes between two resin layers. The flat wound electrode group 101 is formed such that a laminate, in which a negative electrode 103, a separator 104, a positive electrode 105, and a separator 104 are laminated in this order from an outside, is wound in a swirl manner, and is subjected to press molding. An outermost negative electrode 103 has a configuration in which a negative electrode material layer 103b is formed on one surface of a negative electrode collector 103a at an inner surface side, as illustrated in FIG. 2. Other negative electrodes 103 are configured such that the negative electrode material layer 103b is formed on both surfaces of the negative electrode collector 103a. An active material in the negative electrode material layer 103b includes a battery active material according to the first embodiment. The positive electrode 105 is configured such that a positive electrode layer 105b is formed on both surfaces of a positive electrode collector 105a.

A negative electrode terminal 106 is electrically connected with the negative electrode collector 103a of the outermost negative electrode 103 in the vicinity of an outer peripheral end of the wound electrode group 101, and a positive electrode terminal 107 is electrically connected with the positive electrode collector 105a of the inner-side positive electrode 105. These negative electrode terminal 106 and positive electrode terminal 107 extend through an opening of the bag-like exterior material 102 to an outside. For example, a liquid non-aqueous electrolyte solution is poured through the opening of the bag-like exterior material 102. The opening of the bag-like exterior material 102 is sealed by heat by pinching the negative electrode terminal 106 and the positive electrode terminal 107, so that the wound electrode group 101 and the liquid non-aqueous electrolyte solution are sealed.

Examples of the negative electrode terminal 106 include aluminum and an aluminum alloy containing a chemical element, such as Mg, Ti, Zn, Mn, Fe, Cu, or Si. The material of the negative electrode terminal 106 is favorably a similar material to the negative electrode collector 103a so as to decrease contact resistance with the negative collector 103a.

As the positive electrode terminal 107, a material can be used, which has electrical stability and conductivity in a range where a potential to a lithium ion metal is from 3 to 4.25 V. Examples include aluminum and an aluminum alloy containing a chemical element, such as Mg, Ti, Zn, Mn, Fe, Cu, or Si. The material of the positive electrode terminal 107 is favorably a similar material to the positive electrode collector 105a so as to decrease contact resistance with the positive electrode collector 105a.

Hereinafter, the bag-like exterior material 102, the positive electrode 105, the negative electrode 103, the electrolyte solution, and the separator 104, which are configuration members of the non-aqueous electrolyte secondary battery 100, will be described in detail.

1) Negative Electrode 103

The negative electrode 103 includes the negative electrode collector 103a and the negative electrode material layer 103b (negative electrode active material-containing layer). The negative electrode material layer 103b is formed on one surface or both surfaces of the collector 103a, and includes an active material and arbitrarily includes a conducting agent and a binding agent.

The negative electrode active material is favorably a titanium-containing oxide from a viewpoint of a cycle life. To be specific, lithium titanate having a spinel structure is favorable. $Li_{4+x}Ti_5O_{12}$ ($0 \leq x \leq 3$) having a spinel-type structure is excellent in a cycle characteristic and safety.

An average primary particle diameter of the negative electrode active material is favorably 1 μm or less, and a specific surface area by a BET method by $N_2$ absorption is favorably in a range from 5 to 50 $m^2/g$. The negative electrode active material having such an average particle diameter and a specific surface area can enhance a utilization rate, and can take out a substantially high capacity. Note that the BET specific surface area by $N_2$ gas absorption can be measured using a micromeritics ASPA-2010 manufactured by SHIMADZU CORPORATION, and $N_2$ as an absorption gas.

The conductive particles play a role of supporting electrical conductivity among active materials and forming a reaction field of a supported catalyst. Therefore, the conductive particles require high electrical conductivity. The conductive particles are favorably, but are not particularly limited to, at least one type of carbon material particles selected from the group including graphite such as natural graphite and artificial graphite, carbon black such as acetylene black and Ketjen black, and a vapor-grown carbon fiber such as carbon nanotube and carbon nanofiber. Meanwhile, diamond-like carbon, glassy carbon, a conductive polymer, and the like are not favorable because they have lower electrical conductivity than the conductive particles, and the cost is high.

While the particle diameter of the conductive particle is not particularly limited, the average primary particle diameter is favorably from 0.01 to 5 μm. The particle diameter of the conductive particle falls within the range, and thus the surface of the conductive particles can be supported by a metal or an alloy in a particle manner. With the support, the above effect can be sufficiently exerted. The average primary particle diameter can be measured by the following method. By TEM observation, the diameter of the conductive particle is obtained, and an average value of arbitrary number of particles is employed as the average primary particle diameter.

The negative electrode material layer 103b can include a binding agent. The binding agent is combined to fill gaps among dispersed negative electrode active materials, and binds the active material and the conducting agent. As the binding agent, polytetrafluoroethylene (PTFE) or polyvinylidene fluoride (PVdF) can be used. Further, the binding agent binds the negative electrode active material and the collector.

In the negative electrode material layer 103b, the active material content is favorably from 70 to 96 parts by mass, the conducting agent content is favorably from 2 to 28 parts by mass, and the binding agent content is favorably from 2 to 28 parts by mass, where the negative electrode material layer 103b is 100 parts by mass.

The amount of the conducting agent in the negative electrode material layer 103b is 2 parts by mass or more, whereby the current collection performance of the negative electrode material layer 103b can be improved, and an excellent large current characteristic can be obtained in a non-aqueous electrolyte battery. Further, the amount of the binding agent in the negative electrode material layer 103b is 2 parts by mass or more, whereby binding properties between the negative electrode material layer 103b and the negative electrode collector 103a can be improved, and an excellent cycle characteristic can be obtained. Meanwhile, from a viewpoint of a higher capacity, the negative electrode conducting agent and the binding agent in the negative electrode material layer 103b are favorably 28 parts by mass, or less.

As the collector 103a, a conductive material is used, which is electrochemically stable in a lithium absorption/emission potential of the negative electrode active material. The collector 103a is favorably made of copper, nickel, stainless steel, aluminum, or an aluminum alloy containing one or more chemical elements selected from Mg, Ti, Zn, Mn, Fe, Cu, and Si. The thickness of the collector 103a is favorably from 5 to 20 μm. The collector 103a having such a thickness can balance the strength and weight reduction of the negative electrode.

The negative electrode 103 is produced such that the negative electrode active material, the conducting agent, and the binding agent are suspended in a general-purpose solvent to prepare a slurry, the prepared slurry is applied to the collector 103a and dried to form the negative electrode material layer 103b, and the negative electrode material layer 103b is then pressed. Alternatively, the negative electrode 103 may be produced such that the active material, the conducting agent, and the binding agent are formed into a pellet and the pellet is used as the negative electrode material layer 103b, and the negative electrode material layer 103b is formed on the collector 103a.

2) Positive Electrode 105

The positive electrode 105 includes the positive electrode collector 105a and the positive electrode material layer 105b (positive electrode active material-containing layer). The positive electrode material layer 105b is formed on one surface or both surfaces of the collector 105a. The positive electrode material layer 105b includes the active material, and arbitrarily includes the conducting agent and the binding agent.

As the active material, an oxide, a sulfide, or a polymer can be used. Examples of the oxide and the sulfide include manganese dioxide ($MnO_2$) capable of absorbing lithium, iron oxide, copper oxide, nickel oxide, lithium-manganese compound oxide (e.g., $Li_xMn_2O_4$ or $Li_xMnO_2$), lithium-nickel compound oxide (e.g., $Li_xNiO_2$), lithium-cobalt compound oxide (e.g., $Li_xCoO_2$), lithium-nickel-cobalt compound oxide (e.g., $LiNi_{1-y}Co_yO_2$), lithium-manganese-cobalt compound oxide (e.g., $Li_xMn_yCo_{1-y}O_2$), lithium-manganese-nickel compound oxide having a spinel structure (e.g., $Li_xMn_{2-y}Ni_yO_4$), lithium-phosphate oxide having an olivine structure (e.g., $Li_xFePO_4$, $Li_xFe_{1-y}Mn_yPO_4$, $Li_xCoPO_4$), iron sulfate [$Fe_2(SO_4)_3$], vanadium oxide (e.g., $V_2O_5$), and lithium-nickel-cobalt-manganese compound oxide. Here, $0 < x \le 1$ and $0 < y \le 1$. As the active material, one of these compounds may be used alone, or a plurality of the compounds may be combined and used.

Examples of the polymer include a conductive polymer material such as polyaniline and polypyrrole, and a disulfide polymer material.

Further, sulfur (S) or carbon fluoride can be used as the active material.

More favorable examples of the active material include lithium-manganese compound oxide having a high positive electrode voltage (e.g., $Li_xMn_2O_4$), lithium-nickel compound oxide (e.g., $Li_xNiO_2$), lithium-cobalt compound oxide (e.g., $Li_xCoO_2$), lithium-nickel-cobalt compound oxide (e.g., $LiNi_{1-y}Co_yO_2$), lithium-manganese-nickel compound oxide having a spinel structure (e.g., $Li_xMn_{2-y}Ni_yO_4$), lithium-manganese-cobalt compound oxide (e.g., $Li_xMn_yCo_{1-y}O_2$), lithium iron phosphate (e.g., $Li_xFePO_4$), and lithium-nickel-cobalt-manganese compound oxide. Here, $0 < x \le 1$ and $0 < y \le 1$.

The specific surface area of the active material is favorably from 0.1 to 10 $m^2/g$. The positive electrode active material having the specific surface area of 0.1 $m^2/g$ or more is favorable from a viewpoint of securing of a sufficient absorption/emission site of lithium ions. The positive electrode active material having the specific surface area of 10 $m^2/g$ or less is favorable from a viewpoint of easy handling in industrial production and securing of favorable charging/discharging performance.

The binding agent binds the active material and the collector 105a. Examples of the binding agent include polytetrafluoroethylene (PTFE), polyvinylidene fluoride (PVdF), and fluororubber.

The conducting agent is combined as needed in order to enhance the current collection performance and to suppress the contact resistance between the active material and the collector 105a. Examples of the conducting agent include a carbonaceous matter, such as acetylene black, carbon black, and graphite.

In the positive electrode material layer 105b, it is favorable to combine the active material of from 80 to 98 parts by mass, and the binding agent of from 2 to 20 parts by mass, where the positive electrode material layer 105b is 100 parts by mass.

The amount of the binding agent in the positive electrode material layer 105b is 2 parts by mass or more, whereby sufficient electrode strength can be obtained. Further, the amount of the binding agent is 20 parts by mass or less, whereby the blending amount of an insulator of the electrode can be reduced, and the internal resistance can be decreased.

When the conducting agent is added to the positive electrode material layer 105b, it is favorable to combine the active material of from 77 to 95 parts by mass, the binding agent of from 2 to 20 parts by mass, and the conducting agent of from 3 to 15 parts by mass, where the positive electrode material layer 105b is 100 parts by mass. The amount of the conducting agent in the positive electrode material layer 105b is 3 parts by mass or more, whereby the above-described effect can be exerted. Further, the amount of the conducting agent in the positive electrode material layer 105b is 15 parts by mass or less, whereby decomposition of the non-aqueous electrolyte on the surface of the positive electrode conducting agent under high-temperature storage can be decreased.

The collector 105a is favorably an aluminum foil, or an aluminum alloy foil containing one or more chemical elements selected from Mg, Ti, Zn, Ni, Cr, Mn, Fe, Cu, and Si.

The thickness of the aluminum foil or the aluminum alloy foil is favorably from 5 to 20 μm, and more favorably 15 μm or less. The purity of the aluminum foil is favorably 99 mass % or more. The content of a transition metal, such as ion, copper, nickel, or chrome, contained in the aluminum foil or the aluminum alloy foil is favorably 1 mass % or less.

The positive electrode 105 is produced such that the active material, the binding agent, and the conducting agent combined as needed are suspended in an appropriate solvent to prepare a slurry, the prepared slurry is applied to the positive electrode collector 105a and dried to form the positive electrode material layer 105b, and the positive electrode material layer 105b is then pressed. The positive electrode 105 may be produced such that the active material, the binding agent, and the conducting agent combined as needed are formed into a pellet and the pellet is used as the positive electrode material layer 105b, and the positive electrode material layer 105b is formed on the collector 105a.

Here, a low-temperature characteristic in the non-aqueous electrolyte secondary battery of the embodiment will be described. In the embodiment, the low-temperature characteristic is evaluated based on −20° C. The low-temperature characteristic is evaluated by two resistance values of Rsol and Rct. The Rsol is a resistance value of 1 kHz of when AC impedance measurement of a cell is performed. Similarly, the Rct is a resistance value of 0.1 Hz.

The Rsol is a dominant parameter in a temperature condition of an ordinary temperature or more. To obtain a battery excellent in an output characteristic (rate characteristic) in the temperature condition of an ordinary temperature or more, an electrolyte solution having a low Rsol is favorable. Meanwhile, at a low temperature, reaction resistance (Rct) different from ion conductivity is increased. To obtain a battery excellent in the output characteristic at a low temperature, an electrolyte solution having a low Rct is favorable. An electrolyte solution material in which both resistance values of Rsol and Rct are low is desired. However, the electrolyte is excellent in one of the Rsol and the Rct, and is less excellent in the other. While having performed examination in order to obtain an electrolyte solution having low Rsol and Rct, the inventor has found that an electrolyte solution, in which a self-diffusion coefficient of the of the chain carbonate in −20° C. in the electrolyte solution solvent falls within a range from $1.4 \times 10^{-10}$ to $2.0 \times 10^{-10}$ $m^2/sec$, is favorable.

3) Electrolyte Solution

The electrolyte solution may be, for example, a liquid non-aqueous electrolyte prepared by dissolving an electrolyte in an organic solvent, or a gel non-aqueous electrolyte that is a compound of a liquid electrolyte and a polymeric material.

The liquid non-aqueous electrolyte is favorably prepared such that an electrolyte with the concentration from 0.5 to 2.5 mol/L, is dissolved in an organic solvent.

A solvent of the non-aqueous electrolyte secondary battery electrolyte solution is favorably a solvent having a high permittivity so as to facilitate dissociation of the electrolyte. As the solvent having a high permittivity, cyclic carbonates (e.g., an ethylene carbonate or a propylene carbonate) are used. However, the solvent having a high permittivity has high viscosity, and prevents diffusion of dissociated Li ions. Therefore, usually, the solvent having a high permittivity is mixed with a solvent having a small permittivity and small viscosity, and used. As the solvent having small viscosity, chain carbonates (e.g., a dimethyl carbonate, an ethyl methyl carbonate, a diethyl carbonate, or the like) are used.

According to the embodiment, the self-diffusion coefficient of the chain carbonate in $-20°$ C. in the electrolyte solution used as the non-aqueous electrolyte secondary battery is in a range from $1.4 \times 10^{-10}$ to $2.0 \times 10^{-10}$ $m^2$/sec.

It is known that the diffusion coefficient of each component in the electrolyte solution is influenced by its molecular size other than the viscosity of the electrolyte solution. The diffusion coefficient becomes smaller as the molecular size becomes larger. Usually, the molecular size of the electrolyte solution solvent takes a unique value to the material. However, in an actual electrolyte solution, the electrolyte solution is in a state of interacting with the electrolyte. In the Li-ion battery electrolyte solution, a part of the solvent molecules is in a state of solvation, in which the solvent is arranged in the vicinity of the dissociated Li ions. In consideration of a reaction at an electrode interface (corresponding to charge/discharge of a battery), the reaction cannot be advanced while the solvation state is maintained. Therefore, a (desolvation) reaction that tears off a coordinated solvent is advanced. For the desolvation, energy in accordance with the number or a binding state of the solvation is required, and is observed as the resistance (Rct) in an actual battery reaction.

The self-diffusion coefficient of a chain carbonate can be considered to reflect a solvation state in the electrolyte solution. It can be considered that, by making the self-diffusion coefficient large, the apparent molecular size becomes small, the solvation energy is decreased, and the resistance can be decreased. Meanwhile, the self-diffusion coefficient of the solvent is not necessarily in conjunction with the ion conductivity of the electrolyte solution. The ion conductivity becomes a resistance component independent of desolvation. While, by changing the concentration or the type of the electrolyte, the diffusion coefficient of the solvent may be increased, the ion conductivity may be decreased depending on the dissociation state or the viscosity of the electrolyte.

If the self-diffusion coefficient of the chain carbonate in $-20°$ C. is smaller than $1.4 \times 10^{-10}$ $m^2$/sec, the resistance of the electrode reaction becomes large, and thus it is not favorable. Further, if the self-diffusion coefficient is larger than $2.0 \times 10^{-10}$ $m^2$/sec, the diffusion coefficient of Li ions is decreased and the Rsol becomes high, and thus it is not favorable. Even in a case where the self-diffusion coefficient of the chain carbonate in $-20°$ C. is $1.4 \times 10^{-10}$ $m^2$/sec or more, the ion conductivity of the electrolyte solution becomes low using a typical separator. In this case, it is favorable to use the separator 104 of the embodiment. Description of the separator 104 will be given below.

The self-diffusion coefficient of the chain carbonate is influenced by the apparent molecular size in the electrolyte solution. A part of the chain carbonate becomes in a state of being coordinated with a cation or an anion of the electrolyte dissociated in the electrolyte solution. A lithium electrolyte whose cation is a lithium ion is used as the electrolyte used in the electrolyte solution of the lithium ion secondary battery. To make the self-diffusion coefficient large, it is favorable to mix different types of anions. Therefore, it is favorable to mix a plurality of lithium electrolytes as the electrolytes of a lithium ion secondary battery. This is because, when different anions exist in the vicinity of the chain carbonate, balance of interaction between the anions and the solvent is lost, and the apparent molecular size becomes small. However, if two types or more of lithium electrolytes are simply mixed, mutual influence of the anions becomes large, and the self-diffusion coefficient cannot be made large. Further, if the concentration of the electrolyte is too large by the mixture, the viscosity of the electrolyte solution is increased and the Rsol is decreased. Therefore, it is not favorable. Therefore, it is favorable that the lithium electrolyte to be mixed is 10 wt % or less of the electrolyte solution.

As an example of the electrolyte, $LiPF_6$ is favorable as a low Rsol lithium electrolyte. $LiPF_6$ is favorable from a nature of less easily oxidized even in a high potential. An electrolyte including only $LiPF_6$ has a high Rct, however, Rct can be reduced by mixing different types of lithium electrolyte As examples of the lithium electrolyte of the embodiment, $LiBF_4$, LiBOB (lithium bis (oxalate) borate), $LiH_2PO_3$, $Li_2HPO_3$, $Li_2PO_2$, $LiPO_2F_2$, LiFSI (lithium bis (fluorosulfonyl) imide), LiTFSI (lithium bis (trifluoromethanesulfonyl) imide), $LiClO_4$ (lithium percrorate), and $LiAsF_6$ (lithium hexafluoroarsenate) are favorable because the Rct in $-20°$ C. is reduced by mixing different types of the lithium electrolytes selected from the above. In the embodiment, it is favorable to use mixture of different types of the lithium electrolytes. When the lithium electrolytes are mixed, different types of anion exist around the chain carbonate. As a result, coordination energy is unbalanced because various types of interaction state of the solvent and the different types of anion. Then the Rct in $-20°$ C. is reduced when a solvation energy for Li ion in the electrolyte solution is reduced. The lithium electrolytes included in the mixture may have a high Rct or a low Rct. A lithium electrolyte having low Rct used for reducing Rct may not necessary because of the above reason. These lithium electrolytes are favorably from 0.5 wt % to 10 wt %, based on the weight of the electrolyte solution, because the Rct and the Rsol can be low with good balance. If the mixture amount of the lithium electrolytes, the Rct becomes high, and the rate characteristic of the battery in an ordinary temperature becomes poor. Therefore, it is not favorable. Further, if the mixture amount of the lithium electrolyte is too small, an effect of improvement of the rate characteristic at a low temperature is substantially lost. Therefore, it is not favorable.

Next, a method of measuring a self-diffusion coefficient will be described. A diffusion coefficient of the electrolyte solution solvent can be obtained by pulsed magnetic field gradient (PFG) NMR measurement using proton (1H)-nuclear magnetic resonance (NMR). The PFG-NMR method is a technique of applying a magnetic field gradient pulse to a sample of $-20°$ C., and measuring intensity attenuation after a given time as a peak. During passing of a given time (diffusion time), an object substance is moved according to the self-diffusion coefficient, and the center of gravity is changed. As a result, the intensity attenuation is caused, and the degree of attenuation depends on the intensity of the PFG to be applied. The peak intensity and the diffusion coefficient are expressed by the following two expressions.

The chain carbonate and other electrolyte solution components can be determined from a spectrum of the 1H-NMR. The 1H-NMR measurement of an object chain carbonate alone is performed, and a signal specific to the object chain carbonate is assigned from the number, the intensity, and the chemical shift of signals in the spectrum of the electrolyte solution. By reference to the attenuation with respect to the PFG intensity of the assigned signal, the object chain carbonate and others can be distinguished.

$$E = E_0 \exp[-\gamma^2 \times G^2 \times \delta^2 \times D \times (\Delta - \delta/3)]$$

D in the expression is the diffusion coefficient, G is the PFG intensity, $\Delta$ is a diffusion time, $\delta$ is an applied time of the PFG, $\gamma$ is a magnetic rotation ratio, E is signal echo intensity, and $E_0$ is signal echo intensity of when G is minimum. The expression is an exponential function where the base is Napier's constant e.

Here, the values other than E, $E_0$, G, and D are constant, and if the expression is modified and the constant terms are put together by A, the expression can be expressed by:

$$\ln(E/E_0) = -A \times G^2 \times D$$

Therefore, the PFG intensity is changed, the peak intensity is observed, and the diffusion coefficient can be calculated from the inclination of the plot of the above expression. The expression is an exponential function where the base is Napier's constant e. Details of the above-described measurement method are described in Journal of the society of rubber science and technology, Volume 76, No. 9, 324p (2003), and J. Phys. Chem. B, 103, 519 (1999).

4) Separator 104

The separator 104 may be formed of, for example, a porous film containing polyethylene, polypropylene, cellulose, or polyvinylidene fluoride (PVdF), or a non-woven fabric made of a synthetic resin. Among them, the porous film formed of polyethylene or polypropylene can be melted at a given temperature and can cut off a current, and thus is the separator 104 that can improve the safety.

The separator 104 prevents short circuit of the positive electrode 105 and the negative electrode 103, and is expected to play a role to prevent the runaway of the battery at a time of abnormality due to thermal contraction, and the like. Therefore, normally, the separator 104 is required to have a certain thickness as well as the strength, and not to have a large hole (through hole). Especially, in a battery using carbon as the negative electrode, deposition of a Li metal may be caused because of its low operation potential when used at a low temperature. The deposited Li metal is called dendrite, and is known to have a needle-like structure. When the Li dendrite is deposited and grown in the battery, the Li dendrite penetrates the separator 104 and reaches the opposite electrode, and the battery causes abnormal heat generation (internal short circuit). Therefore, the separator 104 of the battery is required to have a thickness and not to have a large hole so that the internal short circuit is not caused even if the dendrite is deposited to some extent.

Meanwhile, from a viewpoint of battery characteristics, the resistance of the separator 104 is increased as the separator 104 is thicker and has less holes. This is because the Li ion diffusion of the electrolyte solution filled in the separator 104 is hindered, and the resistance of the separator 104 is increased. Therefore, the safety of the battery and the battery characteristics are in a trade-off relationship.

In the embodiment, as the negative electrode of the battery, a titanium-containing oxide is used. The titanium-containing oxide has a high reaction potential with Li ions, which is 0.8 V or more, and deposition of Li dendrite does not substantially occur at a low-temperature operation. Further, even if contact of the positive electrode and the negative electrode (internal short circuit) occurs, the contact negative electrode is quickly discharged and becomes in an isolated state, and thus an excessive current does not flow. Therefore, the separator 104 having a through hole that cannot be used in a carbon negative electrode can be used.

By using the thin separator 104 with a large hole, the electrolyte solution can be held in the non-aqueous electrolyte secondary battery. Further, the diffusion of the electrolyte solution can be smoothly advanced. Therefore, the thin separator 104 with a large hole can decrease the resistance of the non-aqueous electrolyte secondary battery. While this resistance corresponds to the diffusibility of Li ions, that is, the ion conductivity, the structure of the separator 104 itself does not contribute to the electrode reaction resistance (Rct). The separator 104 that improve the ion conductivity is a favorable material from a viewpoint of the ion conductivity, when a chain carbonate in which the self-diffusion coefficient is $1.4 \times 10^{-10}$ m$^2$/sec or more is used as the electrolyte solution solvent.

Meanwhile, there is a possibility that the ion conductivity is decreased when the self-diffusion coefficient of the solvent of the electrolyte solution is increased. Because the separator 104 is thin and has a through hole, influence due to change of the ion conductivity becomes relatively small, and an effect by an increase of the self-diffusion coefficient of the solvent of the electrolyte solution can be increased. Therefore, it is desirable that a certain amount of through holes exists in the separator 104. Note that, even if there is the effect of the ion conductivity, the combination of the carbon negative electrode and the separator 104 of the embodiment is not favorable because of the above reason.

It is favorable that holes having an average diameter in a range from 10 to 100 μm, exist in the separator 104. The non-aqueous electrolyte secondary battery using the separator 104 having the holes in this range has an advantage of low resistance and high safety. If the hole in the separator 104 is smaller than 10 μm, the diffusion of Li ions in the separator 104 is hindered, and the resistance is increased. Therefore, it is not favorable. If the hole in the separator 104 is larger than 100 μm, the positive electrode and the negative electrode become more easily in contact with each other, and a self-discharge amount is increased. Therefore, it is not favorable.

It is not favorable to have too many holes or too fewer holes in the separator 104 from the viewpoint of the ion conductivity and suppression of the self-discharge. Therefore, the area of the holes in the surface that is in contact with the positive electrode or the negative electrode of the separator 104 is from 50% to 80%.

An average thickness of the separator 104 is favorably in a range from 2 to 30 μm. The non-aqueous electrolyte secondary battery using the separator 104 having the thickness of this range has an advantage of low resistance and high safety. If the thickness is smaller than 2 μm, the distance between the positive electrode and the negative electrode is small, and the self-discharge becomes large during storage. Therefore, it is not favorable. If the thickness is larger than 30 μm, the diffusion distance of Li ions becomes large, and the resistance is increased. Therefore, it is not favorable.

The thickness of the separator 104 is more favorably from 3 to 15 μm. The non-aqueous electrolyte secondary battery using the separator 104 having the thickness of 15 μm or less is more favorable because the diffusion distance of Li ions is further decreased. The non-aqueous electrolyte secondary battery using the separator 104 having the thickness of 3 μm or more is favorable because the self-discharge is further decreased. Note that it is difficult for the separator 104 having the thickness of 15 μm or less to use an active material that has a possibility of occurrence of lithium dendrite. When the titanium-containing oxide is used as the negative electrode, the thickness of the separator 104 is more favorably 15 µm or less.

The thickness of the separator 104 can be an average value of the thickness measured in a center portion at intervals of 1 cm in the length direction of the separator 104, from which the electrode is peeled.

Further, the hole of the separator 104 can be measured by the following method. A pore diameter of the separator 104 is measured using a mercury penetration porosimeter (e.g., AutoPore IV9500 manufactured by SHIMADZU CORPORATION). From an obtained profile of the pore diameter and pore volume, if the pore volume in the pore diameter of 10 µm is 0.15 mL or more per 1 g of the separator 104, it is defined to have a pore of 10 µm or more. Similarly, if the pore volume in the pore diameter of 100 µm is 0.15 mL or less per 1 g of the separator 104, it is defined not to have a pore of 100 µm or more.

5) Exterior Member

As the exterior member, a container made of a laminated film container or a container made of a metal can be used. The thickness of the laminated film is favorably 0.5 mm or less, and more favorably 0.2 mm or less. The thickness of the container made of a metal is favorably 1 mm or less. More favorable range is 0.5 mm or less, and further more favorable range is 0.2 mm or less.

Examples of the shape of the exterior member include a flat type (thin type), a square type, a cylindrical type, a coin type, and a button type. Examples of the exterior member include a small battery exterior member mounted on a mobile electronic device, a large battery exterior member mounted on a two-wheel to four wheel vehicle, and the like, according to the dimension of the battery.

As the laminated film, a multilayer film in which a metal layer intervenes between resin layers is used. The metal layer is favorably an aluminum foil or an aluminum alloy foil for weight reduction. As the resin layer is, for example, a polymeric material, such as polypropylene (PP), polyethylene (PE), nylon, or polyethylene terephthalate (PET), can be used. The laminated film can be formed into the exterior member by performing sealing by heat fusion.

The container made of a metal is produced from aluminum, an aluminum alloy, or the like. The aluminum alloy is favorably an alloy containing a chemical element, such as magnesium, zinc, or silicon. When a transition metal, such as iron, copper, nickel, or chromium, is contained in the alloy, the content of the transition metal is favorably 1 part by mass or less. This enables long-term reliability and heat dissipation to be rapidly improved under a high-temperature environment.

With the above-described configuration, the non-aqueous electrolyte secondary battery of the embodiment can decrease AC resistance. As described above, at a low temperature, contribution of the Rct component is large, and thus it is desirable to decrease the resistance in order to improve an output characteristic at a low temperature. Therefore, it is favorable to increase the self-diffusion coefficient of the chain carbonate in the electrolyte solution. Meanwhile, if the self-diffusion coefficient is increased, the ion conductivity is decreased. In that case, the Rsol is increased. At an ordinary temperature or more, contribution of the Rsol component is large, and an increase in the Rsol is not favorable to maintain the output characteristic at the ordinary temperature. When focusing on one of the Rsol or Rct, the resistance of the entire cell may not be decreased. Here, by using the thin separator 104 with a large hole, the ion conductivity in the separator 104 is highly maintained, and an increase in the Rsol is suppressed. By using the separator 104, the resistance of the battery can be decreased. Therefore, it is favorable that the Rsol and Rct respectively satisfy Rsol<20 $\Omega \cdot cm^2$ and Rct<120 $\Omega \cdot cm^2$ because the resistance of the battery is low.

To obtain a stable output characteristic at operation temperatures from a low temperature to a high temperature, a battery having good balance in the output characteristic at the low temperature and the output characteristic at the ordinary temperature or more is favorable. In the non-aqueous electrolyte secondary battery of the embodiment, the balance can become more favorable by performing adjustment of the Rsol and Rct. Therefore, the Rsol and Rct favorably satisfy a relationship of Rsol/Rct>0.16. For a similar reason, the Rsol and Rct favorably satisfy a relationship of 0.3>Rsol/Rct>0.16.

The Rsol and Rct are measured by the following method. A battery is connected with an impedance measurement apparatus with a frequency response analyzer (e.g., an electrochemical measurement system 12608 type manufactured by Solartron Corporation). The battery is placed in a thermostatic chamber and is left for two hours or more at a given temperature, and the temperature of the cell is adjusted. The AC impedance measurement is performed while the frequency range is changed from 100 kHz to 0.05 Hz. Resistance values of a real axis corresponding to 1 kHz and 0.1 Hz in a plot (Cole-Cole plot) in an obtained complex plane are obtained. Products obtained by multiplying the resistance values and a facing area of the positive and negative electrodes are defined as the AC resistance Rsol and Rct.

According to the embodiment, a non-aqueous electrolyte battery excellent in the output characteristic at a low temperature or the output characteristic from a low temperature to a high temperature can be provided.

Second Embodiment

A battery pack according to a second embodiment includes one or a plurality of non-aqueous electrolyte secondary batteries (single batteries) of the first embodiment. When a plurality of single batteries is provided, the single batteries are electrically connected in series or in parallel. The battery pack according to the second embodiment uses the non-aqueous electrolyte secondary battery of the first embodiment as a battery cell.

Such a battery pack will be described in detail with reference to FIGS. 3 and 4. As the single battery, a flat battery can be used, for example.

A plurality of single batteries 201 configured from flat non-aqueous electrolyte batteries configures an assembled battery 205 such that outwardly extending negative electrode terminals 202 and positive electrode terminals 203 are aligned in the same direction and laminated, and are fastened with an adhesive tape 204. These single batteries 201 are electrically connected with each other in series, as illustrated in FIG. 4.

A printed circuit board 206 is arranged to face a side surface of the single batteries 21, through which the negative electrode terminals 202 and the positive electrode terminals 203 extend. In the printed circuit board 206, as illustrated in FIG. 4, a thermistor 207, a protection circuit 208, and an energizing terminal 209 for an external device are incorporated. Note that an insulation board (not illustrated) is attached to a surface of the printed circuit board 206 that faces the assembled battery 205 in order to avoid unnecessary connection with a wiring of the assembled battery 205.

A positive electrode-side lead 210 is connected with the positive electrode terminal 203 positioned at an lowermost layer of the assembled battery 205, and a tip thereof is inserted to and is electrically connected with a positive electrode-side connector 211 of the printed circuit board 206. A negative electrode-side lead 212 is connected with the negative electrode terminal 202 positioned at an uppermost layer of the assembled battery 205, and a tip thereof is inserted to and is electrically connected with a negative electrode-side connector 213 of the printed circuit board 206. These connectors 211 and 213 are connected with the protection circuit 208 through wirings 214 and 215 formed on the printed circuit board 206.

The thermistor 207 detects a temperature of the single battery 201, and transmits a detection signal to the protection circuit 208. The protection circuit 208 can interrupt a plus-side wiring 216a and a minus-side wiring 216b between the protection circuit 208 and the energizing terminal 209 to an external device in a predetermined condition. The predetermined condition is, for example, a detected temperature of the thermistor 207 becomes a predetermined temperature or more. Further, the predetermined condition is when over-charge, over-discharge, or an over-current of the single battery 201 is detected. The detection of the over-charge, and the like is performed for individual single battery 201 or for the entire single batteries 201. When the individual single battery 201 is detected, a battery voltage may be detected, or a positive electrode potential or a negative electrode potential may be detected. In the latter case, a lithium electrode used as a reference electrode is inserted into the individual single battery 201. In the case of FIGS. 3 and 4, a wiring 217 for voltage detection is connected to each of the single batteries 201, and a detection signal is transmitted to the protection circuit 208 through the wirings 217.

Protection sheets 218 made of rubber or a resin are respectively arranged on three side surfaces of the assembled battery 205 except the side surface through which the positive electrode terminals 203 and the negative electrode terminals 202 protrude.

The assembled battery 205 is housed in a storage container 219 together with protection sheets 218 and the printed circuit board 206. That is, the protection sheets 218 are respectively arranged on an inner-side surfaces of both sides of the storage container 219 in a long side direction, and on an inner-side surface in a short side direction, and the printed circuit board 206 is arranged on an opposite inner-side surface in the short side direction. The assembled battery 205 is positioned in a space surrounded by the protection sheets 218 and the printed circuit board 206. A lid 220 is attached on an upper surface of the storage container 219.

Note that a thermal contraction tape may be used for the fixing of the assembled battery 205, instead of the adhesive tape 204.

In this case, a protection sheet is arranged on both side surfaces of the assembled battery, a thermal contraction tube is wound, and the thermal contraction tube is then thermally contracted to bind the assembled battery.

Figure 3:
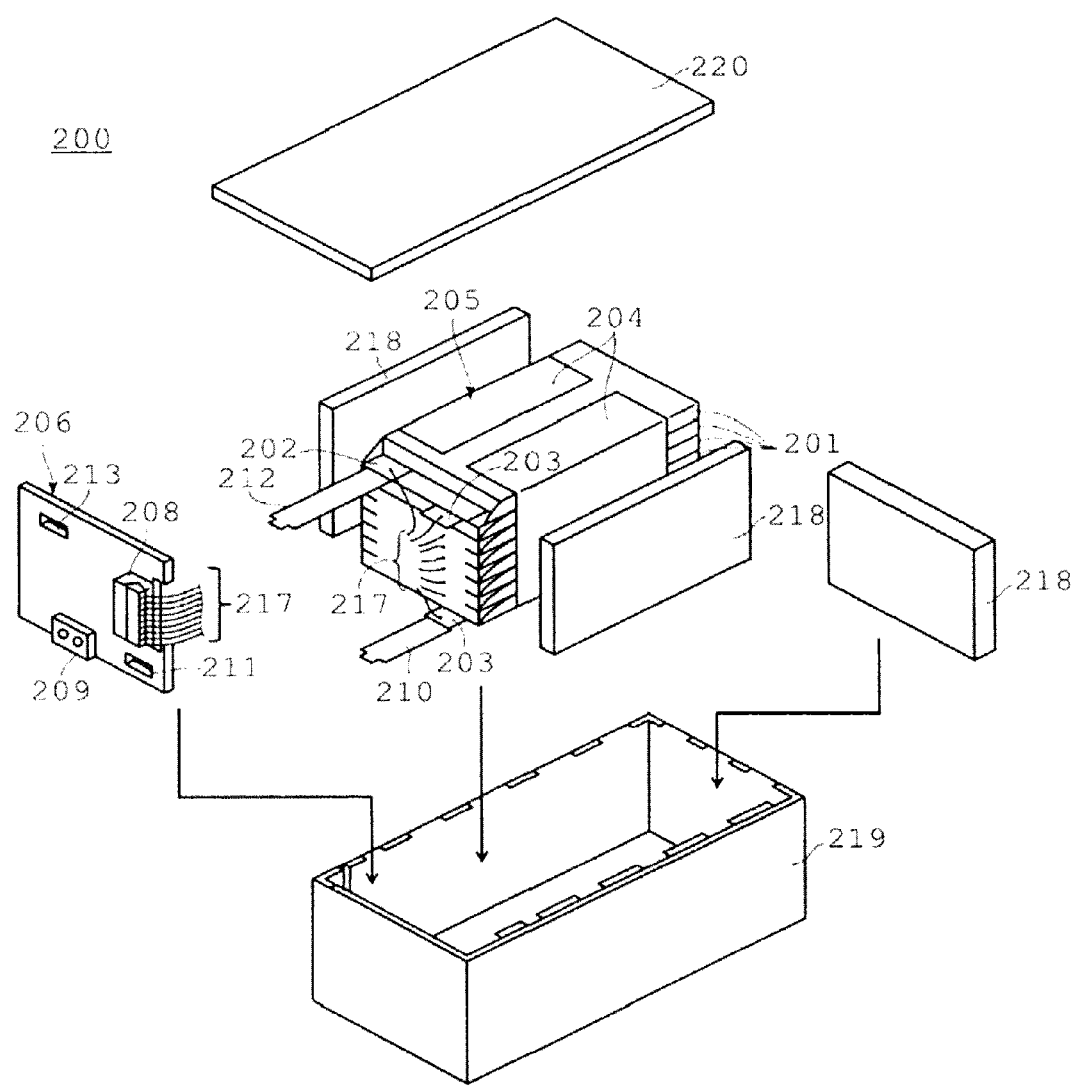
FIG. 3 is a conceptual diagram of a battery pack of an embodiment.
Figure 4:
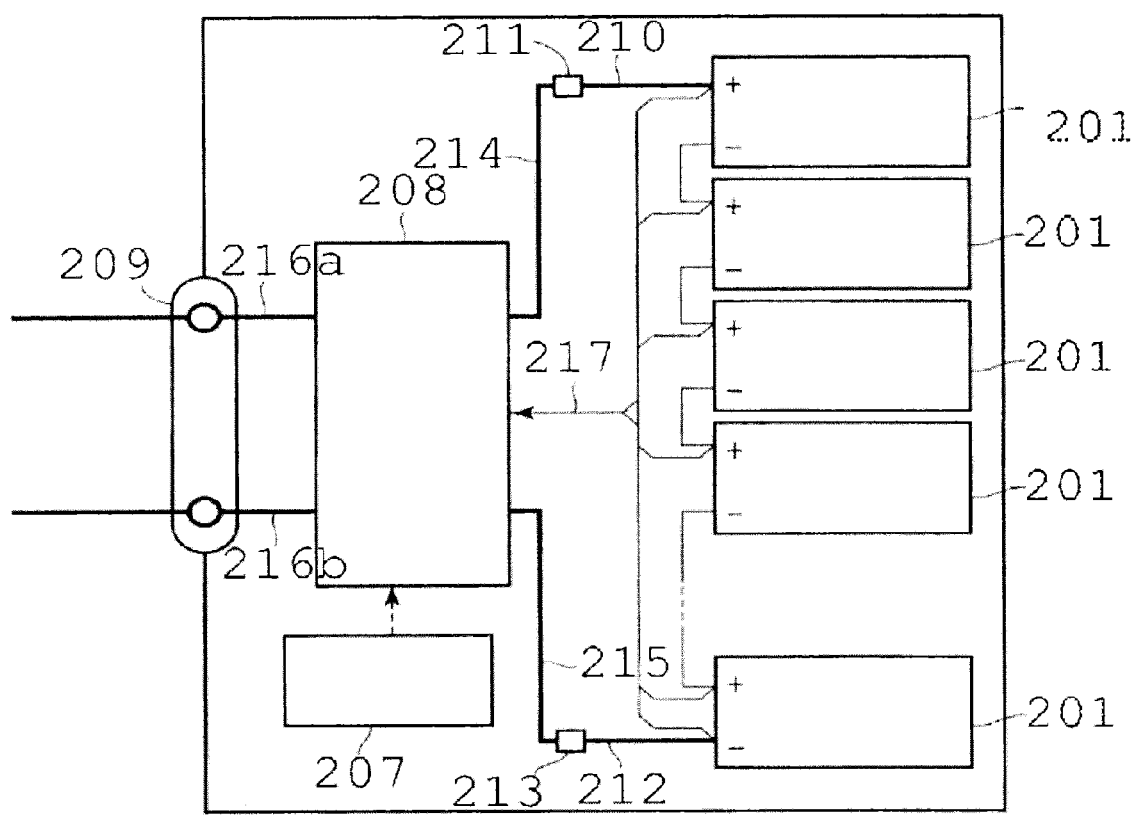
FIG. 4 is a conceptual diagram of a battery pack of an embodiment.

In FIGS. 3 and 4, an embodiment in which the single batteries 201 are connected in series. However, the batteries may be connected in parallel in order to increase the battery capacity. The assembled battery packs can be connected in series or in parallel.

Further, the form of the battery pack is appropriately changed according to use. As a use of the battery pack, uses that demand a cycle characteristic in a large current characteristic are favorable. To be specific, an example of the use include an on-board battery pack for a power supply of digital cameras, two to four-wheel hybrid electric vehicles, two to four-wheel electric vehicles, and assist bicycles. Especially, an on-board battery is favorable.

According to the second embodiment, the non-aqueous electrolyte battery according to the second embodiment is provided. Therefore, a battery pack excellent in the cycle stability, the rate characteristic, the charge/discharge efficiency, the gas generation tolerance can be provided.

EXAMPLES

Hereinafter, the above embodiments will be described in more detail based on examples.

Example 1

(Manufacturing of Negative Electrode)

A negative electrode mixture, which is a mixture of 85 parts by mass of powder spinel-type lithium titanate ($Li_4Ti_5O_{12}$) as the negative electrode active material, 10 parts by mass of acetylene black as the conducting agent, and 5 parts by mass of PVdF as the binding agent, is added to NMP, and is applied to a collector made of an aluminum foil having a thickness of 15 μm and dried. Following that, press treatment is applied, and a negative electrode is produced.

(Manufacturing of Positive Electrode)

A positive electrode mixture, which is a mixture of 85 parts by mass of powder layered rock salt lithium cobaltate ($LiCoO_2$) as the positive electrode active material, 5 parts by mass of graphite and 5 parts by mass of acetylene black as the conducting agent, and 5 parts by mass of PVdF as the binding agent, is added to NMP, and is applied to a collector made of an aluminum foil having a thickness of 15 μm and dried. Following that, press treatment is applied, and a positive electrode is produced.

(Manufacturing of Non-Aqueous Electrolyte Secondary Battery)

The produced positive electrode and negative electrode are laminated through a separator. The laminate is wound in a swirl manner such that the negative electrode comes to an outer periphery side to produce an electrode group.

As the separator, a separator made of a polyethylene porous film and cellulose is used. An average value of thickness of a center portion of the separator measured by intervals of 1 cm is 12 μm. A separator having a hole in its inside, the maximum diameter of which is 30 μm, is used.

(Adjustment of Electrolytic Solution)

1.0 mol/L of lithium hexafluorophosphate is dissolved in a mixed solvent in which an ethylene carbonate (EC) and an ethyl methyl carbonate (EMC) are mixed at a volume ratio of 1:2, and a non-aqueous Electrolyte solution is prepared. Lithium bis (oxalate) borate (LiBOB) is mixed with the adjusted non-aqueous electrolyte solution so as to be 1 mass % based on the weight of the electrolyte solution.

(Evaluation of Self-Diffusion Coefficient)

The diffusion coefficient of the EMC (chain carbonate) in the electrolyte solution is measured by the following method. The battery is dismantled in a grove box replaced with argon gas, and the electrolyte solution is taken out. 100 μL of the obtained electrolyte solution is collected, and introduced into a micro tube of ECA-400 manufactured by JEOL Ltd., and 1H-NMR measurement is performed. A sample portion is cooled to −20° C., and held for two hours, and measurement is performed. A peak of MEC is identified from a chemical shift value of an obtained spectrum. Following that, 20 points of PFG intensity are measured in a range from 0.02 to 0.3 T/m, where an applied time of PFG is 4.0 msec, a diffusion time is 200 msec, and change of peak attenuation intensity is obtained. From the inclination of the obtained plot, the self-diffusion coefficient of the solvent component is calculated. The obtained self-diffusion coefficient of the solvent is $1.8 \times 10^{-10}$ m²sec.

The produced electrode group and the prepared non-aqueous electrolyte solution are housed in an aluminum laminate container, and a non-aqueous electrolyte secondary battery is assembled. Note that the apply amounts of the positive electrode and the negative electrode are adjusted so that the entire capacity of the assembled secondary battery becomes 1000 mAh.

Examples 2 to 16 and Comparative Examples 1 to 6

Similarly to the example 1, in examples 2 to 16 and comparative examples 1 to 6, electrode groups and non-aqueous electrolyte secondary batteries are produced, self-diffusion coefficients are evaluated, and adjustment of positive electrodes and negative electrodes are performed, in conditions indicated in Tables 1 and 2.

TABLE 1

| | Negative electrode active material | Separator thickness (μm: micro meter) | Maximum pore diameter (μm: micro meter) | Solvent |
|---|---|---|---|---|
| Example 1 | $Li_4Ti_5O_{12}$ | 12 μm | 30 μm | EC/EMC = 1/2 |
| Example 2 | $Li_4Ti_5O_{12}$ | 12 μm | 30 μm | EC/EMC = 1/2 |
| Example 3 | $Li_4Ti_5O_{12}$ | 12 μm | 30 μm | EC/EMC = 1/2 |
| Example 4 | $Li_4Ti_5O_{12}$ | 12 μm | 30 μm | EC/EMC = 1/2 |
| Example 5 | $Li_4Ti_5O_{12}$ | 12 μm | 30 μm | EC/EMC = 1/2 |
| Example 6 | $Li_4Ti_5O_{12}$ | 12 μm | 30 μm | EC/EMC = 1/2 |
| Example 7 | $Li_4Ti_5O_{12}$ | 12 μm | 30 μm | EC/EMC = 1/2 |
| Example 8 | $Li_4Ti_5O_{12}$ | 12 μm | 30 μm | EC/EMC = 1/2 |
| Example 9 | $Li_4Ti_5O_{12}$ | 12 μm | 30 μm | EC/EMC = 1/2 |
| Example 10 | $Li_4Ti_5O_{12}$ | 12 μm | 30 μm | EC/EMC = 1/2 |
| Example 11 | $Li_4Ti_5O_{12}$ | 12 μm | 30 μm | EC/EMC = 1/2 |
| Example 12 | $Li_4Ti_5O_{12}$ | 12 μm | 30 μm | PC/EMC = 1/2 |
| Example 13 | $Li_4Ti_5O_{12}$ | 12 μm | 30 μm | EC/DEC = 1/2 |
| Example 14 | $Li_4Ti_5O_{12}$ | 12 μm | 2 μm | EC/EMC = 1/2 |
| Example 15 | $Li_4Ti_5O_{12}$ | 40 μm | 2 μm | EC/EMC = 1/2 |
| Example 16 | $Li_4Ti_5O_{12}$ | 12 μm | 30 μm | EC/EMC = 1/2 |
| Comparative Example 1 | $Li_4Ti_5O_{12}$ | 12 μm | 30 μm | EC/EMC = 1/2 |
| Comparative Example 2 | $Li_4Ti_5O_{12}$ | 12 μm | 30 μm | EC/EMC = 1/2 |
| Comparative Example 3 | $Li_4Ti_5O_{12}$ | 12 μm | 30 μm | EC/EMC = 1/2 |
| Comparative Example 4 | $Li_4Ti_5O_{12}$ | 12 μm | 30 μm | EC/EMC = 1/2 |
| Comparative Example 5 | $Li_4Ti_5O_{12}$ | 12 μm | 30 μm | EC/EMC = 1/2 |
| Comparative Example 6 | Carbon | 12 μm | 30 μm | EC/EMC = 1/2 |

TABLE 2

| | Electrolyte 1 | Electrolyte 2 | Self-diffusion Coefficient |
|---|---|---|---|
| Example 1 | $LiPF_6$ = 1.0M | LiBOB = 1% | $1.8 \times 10^{-10}$ m² sec |
| Example 2 | $LiPF_6$ = 1.0M | LiBOB = 0.5% | $1.8 \times 10^{-10}$ m² sec |
| Example 3 | $LiPF_6$ = 1.0M | LiBOB = 3% | $1.8 \times 10^{-10}$ m² sec |
| Example 4 | $LiPF_6$ = 1.0M | LiBOB = 5% | $1.7 \times 10^{-10}$ m² sec |
| Example 5 | $LiPF_6$ = 1.0M | LiBOB = 7% | $1.6 \times 10^{-10}$ m² sec |
| Example 6 | $LiPF_6$ = 1.0M | LiBOB = 10% | $1.5 \times 10^{-10}$ m² sec |
| Example 7 | $LiPF_6$ = 1.0M | $LiBF_4$ = 1% | $1.4 \times 10^{-10}$ m² sec |
| Example 8 | $LiPF_6$ = 1.0M | $LiAsF_6$ = 1% | $1.6 \times 10^{-10}$ m² sec |
| Example 9 | $LiPF_6$ = 1.0M | $LiPO_2F_2$ = 1% | $1.9 \times 10^{-10}$ m² sec |
| Example 10 | $LiPF_6$ = 1.0M | LiTFSI = 1% | $1.6 \times 10^{-10}$ m² sec |
| Example 11 | $LiPF_6$ = 1.0M | LiFSI = 1% | $1.5 \times 10^{-10}$ m² sec |
| Example 12 | $LiPF_6$ = 1.0M | LiBOB = 1% | $1.9 \times 10^{-10}$ m² sec |
| Example 13 | $LiPF_6$ = 1.0M | LiBOB = 1% | $1.7 \times 10^{-10}$ m² sec |
| Example 14 | $LiPF_6$ = 1.0M | LiBOB = 1% | $1.8 \times 10^{-10}$ m² sec |
| Example 15 | $LiPF_6$ = 1.0M | LiBOB = 1% | $1.8 \times 10^{-10}$ m² sec |
| Example 16 | $LiPF_6$ = 0.5M | LiBOB = 1% | $1.4 \times 10^{-10}$ m² sec |
| Comparative Example 1 | $LiPF_6$ = 1.0M | — | $1.0 \times 10^{-10}$ m² sec |
| Comparative Example 2 | $LiPF_6$ = 1.0M | LiBOB = 20% | $1.3 \times 10^{-10}$ m² sec |
| Comparative Example 3 | $LiPF_6$ = 1.0M | LiBOB = 15% | $1.2 \times 10^{-10}$ m² sec |
| Comparative Example 4 | $LiPF_6$ = 1.0M | LiBOB = 0.3% | $1.1 \times 10^{-10}$ m² sec |
| Comparative Example 5 | $LiPF_6$ = 3.0M | LiBOB = 1% | $0.8 \times 10^{-10}$ m² sec |
| Comparative Example 6 | $LiPF_6$ = 1.0M | LiBOB = 1% | $1.8 \times 10^{-10}$ m² sec |

(Initial Charge/Discharge Test)

Charge/discharge tests are performed using the batteries of the examples 1 to 16, and the comparative examples 1 to 6, and initial charge/discharge capacities are measured. Charge/discharge is performed in a 25° C. thermostatic chamber, with a current value of 1000 mA in a rage from 1.5 to 3 V.

(Evaluation of Rate Characteristic)

Rate resistance is measured using the batteries of the examples 1 to 16 and the comparative examples 1 to 6. The batteries are charged with a current value of 1000 mA, and are then discharged with 5000 mA, and discharge capacities are measured. A ratio to the discharge capacity in 1000 mA is calculated as the rate characteristic.

(Evaluation of Low-Temperature Characteristic)

The low-temperature resistance is measured using the batteries of the examples 1 to 16 and the comparative examples 1 to 6. The batteries are charged, and are then left in a −20° C. thermostatic chamber for two hours, and temperatures of the batteries are adjusted. Discharge is performed with a current value of 1000 mA, and discharge capacities of −20° C. are measured. A ratio to the discharge capacity in 25° C. is calculated as the low-temperature characteristic.

(Evaluation of Cycle Characteristic)

Accelerated tests of electrode deterioration are performed under a high-temperature environment of 60° C. using the batteries of the examples 1 to 16 and the comparative examples 1 to 6. Charge and discharge are repeatedly performed for 100 cycles (charge/discharge is one cycle), and discharge capacity maintenance rates are checked. Charge and discharge are performed in a condition where a voltage between the positive and negative electrodes is in a potential range from 1.5 to 3.0 V, and a discharge current value is 1000 mA. The capacity maintenance rates are calculated based on an initial discharge capacity at 1000 mA.

Results of characteristic evaluation performed with respect to the examples 1 to 16 and the comparative examples 1 to 6 are illustrated in Table 3.

TABLE 3

| | Rsol/Rct | Low-temperature | Rate | Cycle |
|---|---|---|---|---|
| Example 1 | 0.22 | 82 | 92 | 93 |
| Example 2 | 0.19 | 84 | 90 | 92 |
| Example 3 | 0.23 | 82 | 89 | 92 |
| Example 4 | 0.25 | 81 | 90 | 93 |
| Example 5 | 0.27 | 79 | 88 | 91 |
| Example 6 | 0.30 | 71 | 86 | 89 |
| Example 7 | 0.20 | 78 | 91 | 94 |
| Example 8 | 0.21 | 83 | 90 | 91 |
| Example 9 | 0.25 | 86 | 91 | 94 |
| Example 10 | 0.20 | 79 | 88 | 89 |
| Example 11 | 0.18 | 82 | 89 | 90 |
| Example 12 | 0.22 | 85 | 90 | 90 |
| Example 13 | 0.22 | 76 | 88 | 92 |
| Example 14 | 0.18 | 72 | 86 | 93 |
| Example 15 | 0.16 | 70 | 87 | 90 |
| Example 16 | 0.29 | 70 | 84 | 88 |
| Comparative Example 1 | 0.13 | 65 | 91 | 88 |
| Comparative Example 2 | 0.22 | 70 | 85 | 90 |
| Comparative Example 3 | 0.24 | 66 | 80 | 90 |
| Comparative Example 4 | 0.15 | 65 | 84 | 86 |
| Comparative Example 5 | 0.32 | 64 | 54 | 62 |
| Comparative Example 6 | 0.22 | 59 | 86 | 57 |

Low-temperature: Low-temperature characteristic
Rate: Rate characteristic
Cycle: Cycle characteristic The examples 1 to 16 are higher in the low-temperature characteristic than the comparative examples 1 to 6. Therefore, it has been shown that an increase in resistance at a low temperature is suppressed in the examples 1 to 16, compared with the comparative examples 1 to 6. It has been shown that, even if the composition of the electrolyte solution is changed, the self-diffusion coefficient at a low temperature falls within the range of the embodiment, whereby the low-temperature resistance can be decreased.

The examples 1 to 13 and 16 are higher in the low-temperature characteristic than the comparative examples 1 to 5. It has been shown that, even if a thin separator having a large pore diameter is used, the low-temperature characteristic cannot be improved if the self-diffusion coefficient of the electrolyte solution is nor made large.

The examples 1 to 6 are higher in the low temperature characteristic than the comparative examples 2 to 4. It has been shown that interaction of anions in the electrolyte solution is grater if mixing amount of the lithium electrolytes is too much. Meanwhile, interaction of anions in the electrolyte solution seldom occur if mixing amount of the lithium electrolytes is too few. As the result, it is shown that Rct is increased and the low temperature characteristic is decreased.

The examples 1 and 16 are higher in the rate characteristic than the comparative example 5. It has been shown that the viscosity of the electrolyte solution is increased too much and Rsol is increased if mixing amount of the lithium electrolytes in the electrolyte solution is too much. As the result, it is shown that the low temperature characteristic is decreased because Rsol/Rct beyond a favorable range of the embodiment. Further, the rate characteristic is decreased because Rsol is increased.

It has been found that the examples 1 to 16 are superior in the capacity maintenance rate after 100 cycles to the comparative example 6. It can be considered that, if a thin separator having a large pore diameter is used in the carbon negative electrode, a minute short circuit by deposited Li cannot be prevented and the electrode deterioration is caused. Therefore, it has been shown that the examples 1 to 16 achieve the cycle characteristic while maintaining the low-temperature characteristic.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolyte secondary battery comprising:
   an exterior member;
   a negative electrode containing a titanium-containing oxide housed in the exterior member;
   a positive electrode housed in the exterior member;
   a separator housed in the exterior member, and arranged between the positive electrode and the negative electrode; and
   a non-aqueous electrolyte solution housed in the exterior member,
   wherein at least one type or more chain carbonates are contained in a solvent of the non-aqueous electrolyte solution,
   a self-diffusion coefficient of the chain carbonate in $-20°$ C. is from $1.4 \times 10^{-10}$ to $2.0 \times 10^{-10}$ m$^2$/sec,
   the separator includes a hole having a diameter of from 10 to 100 µm,
   Rsol<20 $\Omega \cdot$cm$^2$ and Rct<120 $\Omega \cdot$cm$^2$ are satisfied where the magnitude of resistance of the non-aqueous electrolyte secondary battery at a time of application of an alternating-current voltage of 1 kHz in $-20°$ C. is Rsol, and the magnitude of resistance at a time of application of an alternating-current voltage of 0.1 Hz is Rct, and
   Rsol/Rct>0.16 is satisfied where the magnitude of resistance of the non-aqueous electrolyte secondary battery at a time of application of an alternating-current voltage of 1 kHz in $-20°$ C. is Rsol, and the magnitude of resistance at a time of application of an alternating-current voltage of 0.1 Hz is Rct,
   the non-aqueous electrolyte solution includes lithium electrolyte, and
   the lithium electrolyte includes LiPF$_6$ and at least one of LiBF$_4$, LiBOB (lithium bis (oxalate) borate), LiH$_2$PO$_3$, Li$_2$HPO$_3$, Li$_2$PO$_2$, LiPO$_2$F$_2$, LiFSI (lithium bis (fluorosulfonyl) imide), LiTFSI (lithium bis (trifluoromethanesulfonyl) imide), LiClO$_4$ (lithium percrorate), and LiAsF$_6$ (lithium hexafluoroarsenate).

2. The battery according to claim 1, wherein the thickness of the separator is from 2 to 30 µm.

3. The battery according to claim 1, wherein the thickness of the separator is from 3 to 15 µm.

4. The battery according to claim 1, wherein 0.3>Rsol/Rct>0.16 is satisfied where the magnitude of resistance of the non-aqueous electrolyte secondary battery at a time of application of an alternating-current voltage of 1 kHz in $-20°$ C. is Rsol, and the magnitude of resistance at a time of application of an alternating-current voltage of 0.1 Hz is Rct.

5. A battery pack comprising:
   a nonaqueous electrolyte secondary battery as a cell, wherein the nonaqueous electrolyte secondary battery comprises, an exterior member, a negative electrode containing a titanium-containing oxide housed in the exterior member, a positive electrode housed in the exterior member, a separator housed in the exterior member, and arranged between the positive electrode and the negative electrode, and a non-aqueous electrolyte solution housed in the exterior member, wherein at least one type or more chain carbonates are contained in a solvent of the non-aqueous electrolyte solution, a non-aqueous electrolyte secondary battery in which a self-diffusion coefficient of the chain carbonate in −20° C. is from $1.4 \times 10^{-10}$ to $2.0 \times 10^{-10}$ m²/sec, is used as a cell, the separator includes a hole having a diameter of from 10 to 100 μm, Rsol<20 Ω·cm² and Rct<120 Ω·cm² are satisfied where the magnitude of resistance of the non-aqueous electrolyte secondary battery at a time of application of an alternating-current voltage of 1 kHz in −20° C. is Rsol, and the magnitude of resistance at a time of application of an alternating-current voltage of 0.1 Hz is Rct, and Rsol/Rct>0.16 is satisfied where the magnitude of resistance of the non-aqueous electrolyte secondary battery at a time of application of an alternating-current voltage of 1 kHz in −20° C. is Rsol, and the magnitude of resistance at a time of application of an alternating-current voltage of 0.1 Hz is Rct, the non-aqueous electrolyte solution includes lithium electrolyte, and the lithium electrolyte includes $LiPF_6$ and at least one of $LiBF_4$, LiBOB (lithium bis (oxalate) borate), $LiH_2PO_3$, $Li_2HPO_3$, $Li_2PO_2$, $LiPO_2F_2$, LiFSI (lithium bis (fluorosulfonyl) imide), LiTFSI (lithium bis (trifluoromethanesulfonyl) imide), $LiClO_4$ (lithium percrorate), and $LiAsF_6$ (lithium hexafluoroarsenate).

6. The battery pack according to claim 5, wherein the thickness of the separator is from 2 to 30 μm.

7. The battery pack according to claim 5, wherein the thickness of the separator is from 3 to 15 μm.

8. The battery pack according to claim 5, wherein 0.3>Rsol/Rct>0.16 is satisfied where the magnitude of resistance of the non-aqueous electrolyte secondary battery at a time of application of an alternating-current voltage of 1 kHz in −20° C. is Rsol, and the magnitude of resistance at a time of application of an alternating-current voltage of 0.1 Hz is Rct.

9. The battery according to claim 1, wherein the lithium electrolyte is 10 wt % or less of the electrolyte solution.

10. The battery according to claim 1, wherein the at least one type or more chain carbonates is selected from a dimethyl carbonate, an ethyl methyl carbonate and a diethyl carbonate.

11. The battery pack according to claim 5, wherein the lithium electrolyte is 10 wt % or less of the electrolyte solution.

12. The battery pack according to claim 5, wherein the at least one type or more chain carbonates is selected from a dimethyl carbonate, an ethyl methyl carbonate and a diethyl carbonate.

13. The battery according to claim 1, wherein the negative electrode includes lithium titanate having a spinel structure.

14. The battery according to claim 1, wherein the negative electrode includes $Li_{4+x}Ti_5O_{12}$ having a spinel structure where x of $Li_{4+x}Ti_5O_{12}$ satisfies 0≤x 3.

15. The battery according to claim 1, wherein the positive electrode includes an oxide, a sulfide, or a polymer.

16. The battery according to claim 1, wherein the positive electrode includes at least one selected from the consisting group of, manganese dioxide, iron oxide, copper oxide, nickel oxide, lithium-manganese compound oxide, lithium-nickel compound oxide, lithium-cobalt compound oxide, lithium-nickel-cobalt compound oxide, lithium-manganese-cobalt compound oxide, lithium-manganese-nickel compound oxide having a spinel structure, lithium-phosphate oxide having an olivine structure, iron sulfate, vanadium oxide, and lithium-nickel-cobalt-manganese compound oxide.

17. The battery pack according to claim 5, wherein the negative electrode includes lithium titanate having a spinel structure.

18. The battery pack according to claim 5, wherein the negative electrode includes $Li_{4+x}Ti_5O_{12}$ having a spinel structure where x of $Li_{4+x}Ti_5O_{12}$ satisfies 0≤x 3.

19. The battery pack according to claim 5, wherein the positive electrode includes an oxide, a sulfide, or a polymer.

20. The battery pack according to claim 5, wherein the positive electrode includes at least one selected from the consisting group of; manganese dioxide, iron oxide, copper oxide, nickel oxide, lithium-manganese compound oxide, lithium-nickel compound oxide, lithium-cobalt compound oxide, lithium-nickel-cobalt compound oxide, lithium-manganese-cobalt compound oxide, lithium-manganese-nickel compound oxide having a spinel structure, lithium-phosphate oxide having an olivine structure, iron sulfate, vanadium oxide, and lithium-nickel-cobalt-manganese compound oxide.

* * * * *